United States Patent Office 2,886,569
Patented May 12, 1959

2,886,569

PRODUCTION OF PYRROCOLINES

William E. Erner, Wilmington, Del., assignor to Houdry Process Corporation, Wilmington, Del., a corporation of Delaware No Drawing. Application August 6, 1956
Serial No. 602,472

3 Claims. (Cl. 260—290)

The present invention relates to catalytic dehydrocyclization of ortho-substituted pyridine and piperidine compounds to produce fused hereteocyclic poly-ring structures containing a common carbon and nitrogen atom, as exemplified by the structure

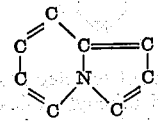

In accordance with the present invention, compounds containing a pyridine or piperidine nucleus having an alkyl or alkenyl group of at least 3 carbon atoms in a straight chain or an alkaryl group attached in a position ortho to the hetero N, are subjected in vapor phase to dehydrocyclization in the presence of supported platinum or paladium catalyst to effect ring closure with the formation of a pyrrole type structure at the common hetero-nitrogen.

The reaction is carried out at temperatures in the range of 750 to 900° F. and preferably in the presence of added hydrogen, which may be in molar ratio of 1:1 to 20:1 to the heterocyclic reactant. It is not necessary to employ superatmospheric pressures in carrying out the process.

The reaction mechanism can be exemplified by the following formulation:

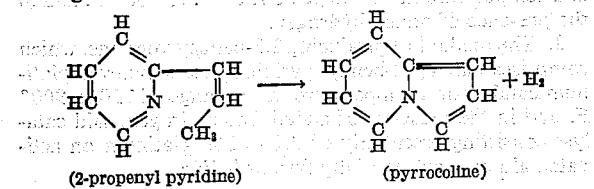

(2-propenyl pyridine)      (pyrrocoline)

When starting with pyridine compounds containing a saturated alkyl side chain, as in the case of conyrine (alpha propyl pyridine), the reaction would include, under the same operating conditions, dehydrogenation of the side chain to the olefinic group, with the resulting production of pyrrocoline.

Instead of the substituted pyridines one can employ the corresponding alkyl or alkenyl piperidines. Under the described operating conditions, dehydrogenation of the piperidine nucleus would take place. It may be possible by proper close control of operating conditions to retain the piperidine nucleus in hydrogenated state; lower temperatures and higher hydrogen partial pressures favor hydrogenation. Compounds of the delta-coniceine type could thus be obtained.

The reaction of 2-alkaryl or aralkyl pyridines is best illustrated by the following:

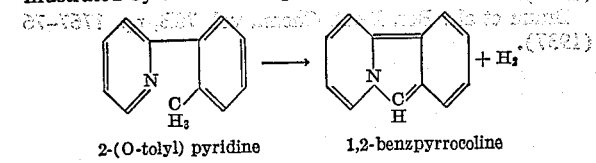

2-(O-tolyl) pyridine      1,2-benzpyrrocoline

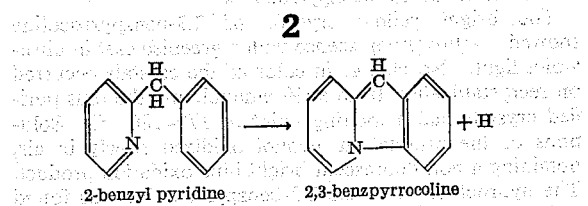

2-benzyl pyridine      2,3-benzpyrrocoline

The catalysts employed comprise a noble metal of the platinum family, particularly platinum or paladium supported on a porous carrier, the noble metal being present in minor amount as from about 0.1 to 3.0% by weight of the carrier. Alumina in the form of activated or gamma alumina is the preferred carrier; other supports include silica gel, silica-alumina, or magnesia.

Platinum catalyst, useful in the present invention, can be prepared by impregnating activated alumina with a dilute aqueous solution of a water soluble platinum salt or complex in sufficient amount to provide the desired quantity of metal, preferably 0.5 to 1.0% by weight of carrier, followed by drying and reduction with hydrogen-containing gas.

If chloroplatinic acid or other halogen-containing platinum (or paladium) compound is employed for impregnation of the alumina, all or part of the halogen will be retained in the catalyst and confer an acid function. While such alumina-supported catalysts containing halogen can be used, these tend to promote scission, polymerization and other undesired side reactions, necessitating more careful control of operating conditions and even then may reduce the yields of desired products. For these reasons it is preferred to employ catalysts having alumina carriers substantially free of halogen, such as those containing 0 to less than 0.05% halogen. Such catalysts can be prepared by using soluble platinum or palladium compounds other than those containing halogen, or by steaming the halide-containing impregnated alumina until the halogen has been removed or reduced to the stated limits.

The use of starting alkyl or alkenyl pyridine or piperidine compounds containing more than 6 carbon atoms in the side chain is not recommended inasmuch as splitting of the chain and the possibility of other side reactions increases with increasing length of the chain.

The pyrrocoline compounds obtained are useful as intermediates for the preparation of polymethine dyes which have been advocated for use in light filters and as antihalation compounds in photographic emulsions. Known dyes of this class include those formed by reaction of alkyl or aryl substituted pyrrocolines with vinyl benz-oxazole acetanilide and those obtained by condensing of pyrrocoline compounds with trialkoxy propene.

Example 1

235 volumes (as liquid) comprising 247 parts by weight of 2-benzyl pyridine were passed as vapor in a carrier gas through a fixed bed reactor containing 40 volumes of steamed platinum-on-alumina catalyst at 910° F., at atmospheric pressure and at a space rate of 0.75 volume reactant per hour per volume of catalyst. Hydrogen was used as carrier gas for vaporizing the benzyl pyridine prior to its admission to the catalytic reactor, in a mol ratio to the benzyl pyridine of 4:1.

The reaction effluent was passed through a tap water cooled condenser with the formation of bright yellow crystals of 2,3-benzpyrrocoline in the condenser and the recovery of 197 parts by weight liquid product (86% liquid recovery). On cooling the liquid product in the receiver to −8° C., additional crystals of the 2,3-benz-pyrrocoline were produced, which together with the crystals washed from the condenser totaled 5 parts by weight.

The mother liquor, which contained in addition to non-crystallized 2,3-benzpyrrocoline unreacted 2-benzyl pyridine and traces of anthracene, was fractionally distilled to yield a recycle charge and 9 parts by weight of a solid residue of crude 2,3-benzpyrrocoline.

The bright yellow crystals of 2,3-benzpyrrocoline showed a yellow fluorescence with a greenish cast in ultraviolet light. No change in color of the crystals occurred on recrystallization from 95% ethanol, and the thus purified crystals had a melting point of 179–180° C. Solutions of the product in alcohol oxidized slowly in air, obtaining a non-fluorescent bright blue oxidation product. The hydrochloride of the 2,3-benzpyrrocoline was found to be soluble in water with a light pink color, and was not fluorescent. By addition of sodium hydroxide to the aqueous hydrochloride salt solution, the yellow fluorescent base was precipitated.

The loss of fluorescence on conversion of the base to salt form can be explained on the basis of change from the coplanar structure with consequent damping of molecular electronic resonance.

In addition to the uses named above for the pyrrocolines as a class, the 2,3-benzpyrrocoline and closely related pyrrocoline compounds exhibiting similar fluorescent properties can be used in known manner as indicators for determining oxidation of packaged and other products by exposure and as components of fluorescent coloring compositions and optical bleaches.

*Example II*

200 volumes constituting 180 parts by weight of 2-n-amyl pyridine, diluted with 6 mols/mol hydrogen gas, were passed over the same catalyst as used in the previous example, at a liquid hourly space rate of 0.75 volume per volume of catalyst and at 800° F. There was obtained 173 grams of crude liquid product comprising 3-ethyl pyrrocoline, the liquid being a highly fluorescent oil which gave the usual color tests of pyrrole compounds. The liquid products from several separate runs showed refractive indices respectively $(n_D^{25})$ of 1.4943, 1.4949, and 1.4962, the index of the starting compound being 1.4865.

Because of the small differences in boiling points of the 3-ethyl pyrrocoline and the starting amyl pyridine, separation by distillation proved extremely difficult and only very low yields of the ethyl pyrrocoline can be thus obtained. More effective separation is accomplished by chromatographic adsorption on silica or alumina gel or by the use of base exchange resins, taking advantage of the differences in basicity of the alkyl pyridine and the corresponding alkyl pyrrocoline obtained therefrom.

The catalyst used in the foregoing examples was prepared by treating activated alumina in the form of 4 mm. cylindrical pellets with 10% acetic acid at room temperature for an hour followed by rinsing in distilled water and thereafter impregnating the pellets with a solution of chloroplatinic acid in an amount to effect a deposit of 0.5% platinum therein. The impregnated pellets were then subjected to an air stream and dried at about 275° F. The dried pellets were then treated with a hydrogen gas stream at about 900° F. for an hour to convert the chloroplatinate to metallic platinum following which the catalyst was dehalided by treatment with a mixture of 10% hydrogen and 90% steam, at 900° F., and again subjected to 100% hydrogen treatment at the same temperature for another hour. The finished catalyst contained 0.1% chloride by weight, 99.4% gamma alumina and 0.5% platinum.

The general reaction for production of pyrrocoline type compounds by dehydrocyclization is applicable to substituted pyridines (and the corresponding piperidine compounds) of the formula

wherein R is: (1) an alkyl or alkenyl group of 3 to 7 carbon atoms in a straight or branched chain; or (2) an alkaryl group containing 1 to 3 carbon atoms in the alkyl chain and in which the aryl is otherwise unsubstituted or may be further substituted by simple non-functional groups; or (3) an aralkyl group containing at least one alkyl group of 1 to 3 carbon atoms in a position ortho to the bridge.

Obviously many modifications and variations of the present invention as hereinbefore set forth may be made without departing from the spirit and scope thereof and therefore only such limitations should be imposed as are indicated in the appended claims.

I claim:

1. The method of dehydrocyclization of o-alkyl pyridine and o-alkyl piperidine compounds to produce fused heterocyclic ring structures containing a common carbon and nitrogen atom, said compounds in non-hydrogenated form having the formula

wherein R is a substituent selected from the group consisting of: (1) alkyl and alkenyl radicals of 3 to 7 carbon atoms, (2) alkaryl radicals containing 1 to 3 carbon atoms in the alkyl chain and (3) aralkyl radicals containing at least one alkyl group of 1 to 3 carbon atoms in a position ortho to the bridge; which method comprises passing such compounds in vapor state at a temperature in the range of 750 to 900° F. in the presence of at least an equal molar quantity of added hydrogen, over supported noble metal catalyst composed of 0.1 to 3% platinum on activated alumina substantially free of halide.

2. The method of producing heterocyclic compounds containing a pyrrocoline structure which comprises dehydrocyclization of an ortho-substituted hydrocarbon pyridine compound containing at least 3 carbon atoms in the hydrocarbon substituent, by contact in vapor state with platinum catalyst supported on a substantially non-acidic carrier composed of alumina substantially free of halide, at a temperature in the range of 750° F. to 900° F. and in the presence of added hydrogen.

3. The method of producing 2,3-benzpyrrocoline, which comprises passing 2-benzyl pyridine over supported platinum catalyst at a temperature in the range of 750 to 900° F. and in the presence of added free hydrogen, said catalyst consisting essentially of 0.1 to 3% platinum on activated alumina substantially free of halide.

References Cited in the file of this patent

UNITED STATES PATENTS

| | | |
|---|---|---|
| 2,182,431 | Groll et al. | Dec. 5, 1939 |
| 2,184,235 | Groll et al. | Dec. 19, 1939 |
| 2,300,971 | Roberts et al. | Nov. 3, 1942 |
| 2,636,863 | Haensel | Apr. 28, 1953 |
| 2,664,404 | Blatz | Dec. 29, 1953 |
| 2,692,240 | Sprauer | Oct. 19, 1954 |
| 2,765,310 | Horrobin | Oct. 2, 1956 |
| 2,765,311 | Horrobin et al. | Oct. 2, 1956 |

OTHER REFERENCES

Arata et al.: Chem. Abstracts, vol. 49, column 10279 (1955).

Zelinsky et al.: Ber. Deut. Chem., vol. 59, pp. 2590–3 (1926).

Braun et al.: Ber. Deut. Chem., vol. 70B, pp. 1767–76 (1937).